(12) United States Patent
Hino et al.

(10) Patent No.: US 10,003,716 B2
(45) Date of Patent: Jun. 19, 2018

(54) GENERATION OF A DIGEST VIDEO

(71) Applicant: SONY CORPORATION, Tokyo (JP)

(72) Inventors: Naoto Hino, Tokyo (JP); Takayuki Ochi, Tokyo (JP); Kosuke Endo, Tokyo (JP); Kei Yoshinaka, Tokyo (JP); Mizuho Hara, Tokyo (JP); Risa Watanabe, Tokyo (JP); Ryo Nakagawa, Tokyo (JP); Kae Okazawa, Tokyo (JP)

(73) Assignees: Sony Corporation, Tokyo (JP); Sony Mobile Communicatons Inc., Tokyo (JP)

( * ) Notice: Subject to any disclaimer, the term of this patent is extended or adjusted under 35 U.S.C. 154(b) by 74 days.

(21) Appl. No.: 14/666,852

(22) Filed: Mar. 24, 2015

(65) Prior Publication Data

US 2016/0286072 A1    Sep. 29, 2016

(51) Int. Cl.
*H04N 5/76* (2006.01)
*H04N 1/21* (2006.01)
(Continued)

(52) U.S. Cl.
CPC ..... *H04N 1/2133* (2013.01); *G06F 17/30056* (2013.01); *G11B 27/034* (2013.01); *G11B 27/11* (2013.01); *H04N 1/00198* (2013.01); *H04N 1/00204* (2013.01); *H04N 1/00458* (2013.01); *H04N 1/215* (2013.01); *H04N 1/2112* (2013.01); *H04N 2101/00* (2013.01);
(Continued)

(58) Field of Classification Search
None
See application file for complete search history.

(56) References Cited

U.S. PATENT DOCUMENTS 8,117,546 B2 *  2/2012  Chang ................. G11B 27/105
                                                 345/619
8,786,753 B2 *  7/2014  Sassa ................ G06F 17/30247
                                                 348/222.1
(Continued)

FOREIGN PATENT DOCUMENTS

JP    2011-82915    4/2011

OTHER PUBLICATIONS www.ComputerShopper.com; "The Top 100 Tech Products of 2013_ The Full List"; Dec. 10, 2013.*

*Primary Examiner* — Gary C Vieaux
(74) *Attorney, Agent, or Firm* — Oblon, McClelland, Maier & Neustadt, L.L.P.

(57) ABSTRACT

Embodiments include systems and methods for an electronic device including circuitry configured to acquire data of a first group of one or more images photographed by a first photographing method with corresponding first attribute information and first photographing time, and acquire data of a second group of one or more images photographed by a second photographing method with corresponding second attribute information and second photographing time; assign a priority to the first group and the second group based on the first photographing method and the second photographing method, respectively; and select one or more images from the first group and the second group based upon the assigned priorities, wherein a time to continuously display the selected one or more images occurs within a predetermined time range for a set display mode.

18 Claims, 8 Drawing Sheets

(51) Int. Cl.
*G11B 27/034* (2006.01)
*G11B 27/11* (2006.01)
*H04N 1/00* (2006.01)
*G06F 17/30* (2006.01)
*H04N 101/00* (2006.01)

(52) U.S. Cl.
CPC ............... *H04N 2201/0084* (2013.01); *H04N 2201/3273* (2013.01)

(56) References Cited

U.S. PATENT DOCUMENTS

2009/0006968 A1* 1/2009 Trask ............... G06F 17/30056 715/730
2011/0025883 A1* 2/2011 Shkurko ............... H04N 5/772 348/231.2
2013/0155088 A1* 6/2013 Wang ............... G06T 1/0007 345/581

* cited by examiner

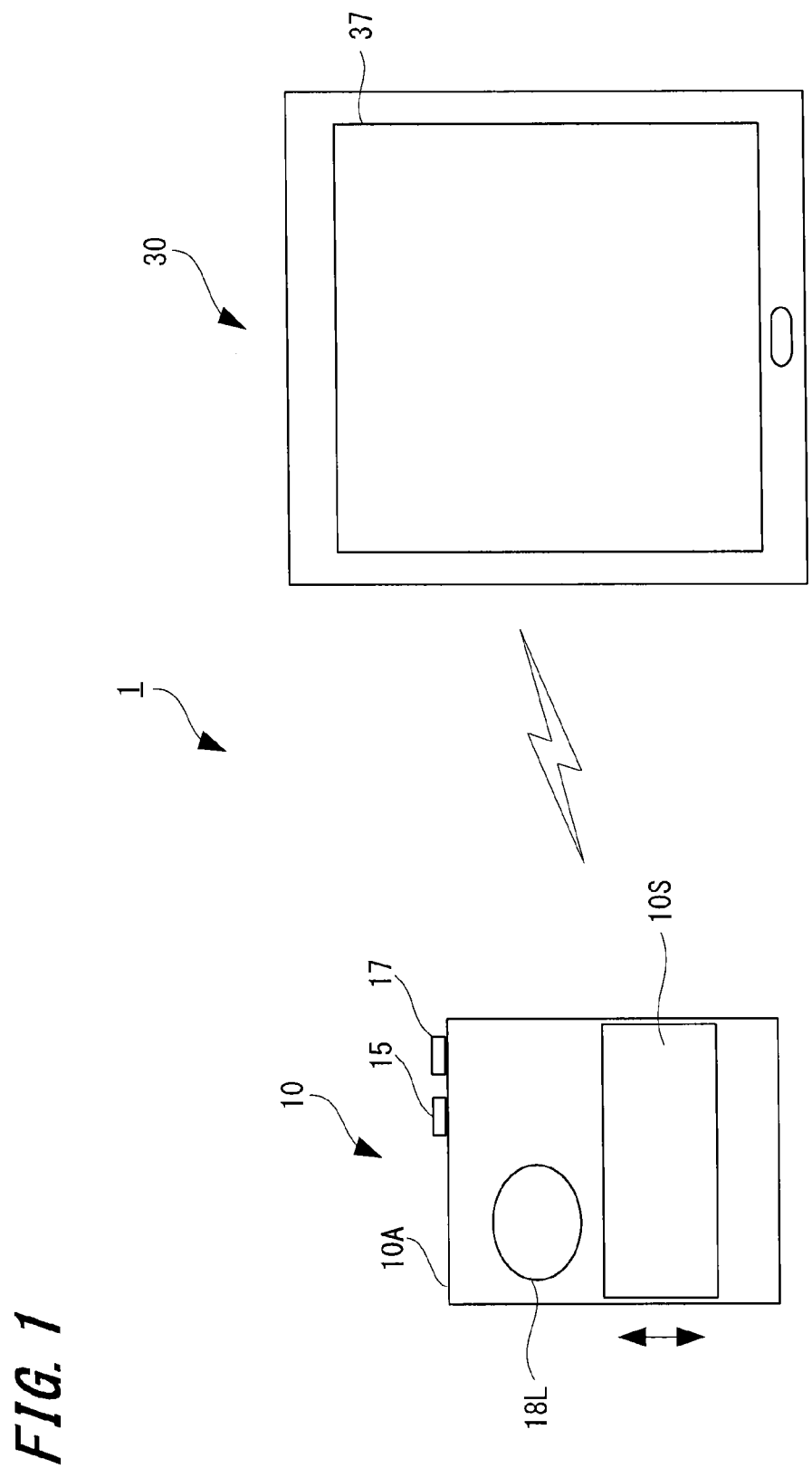

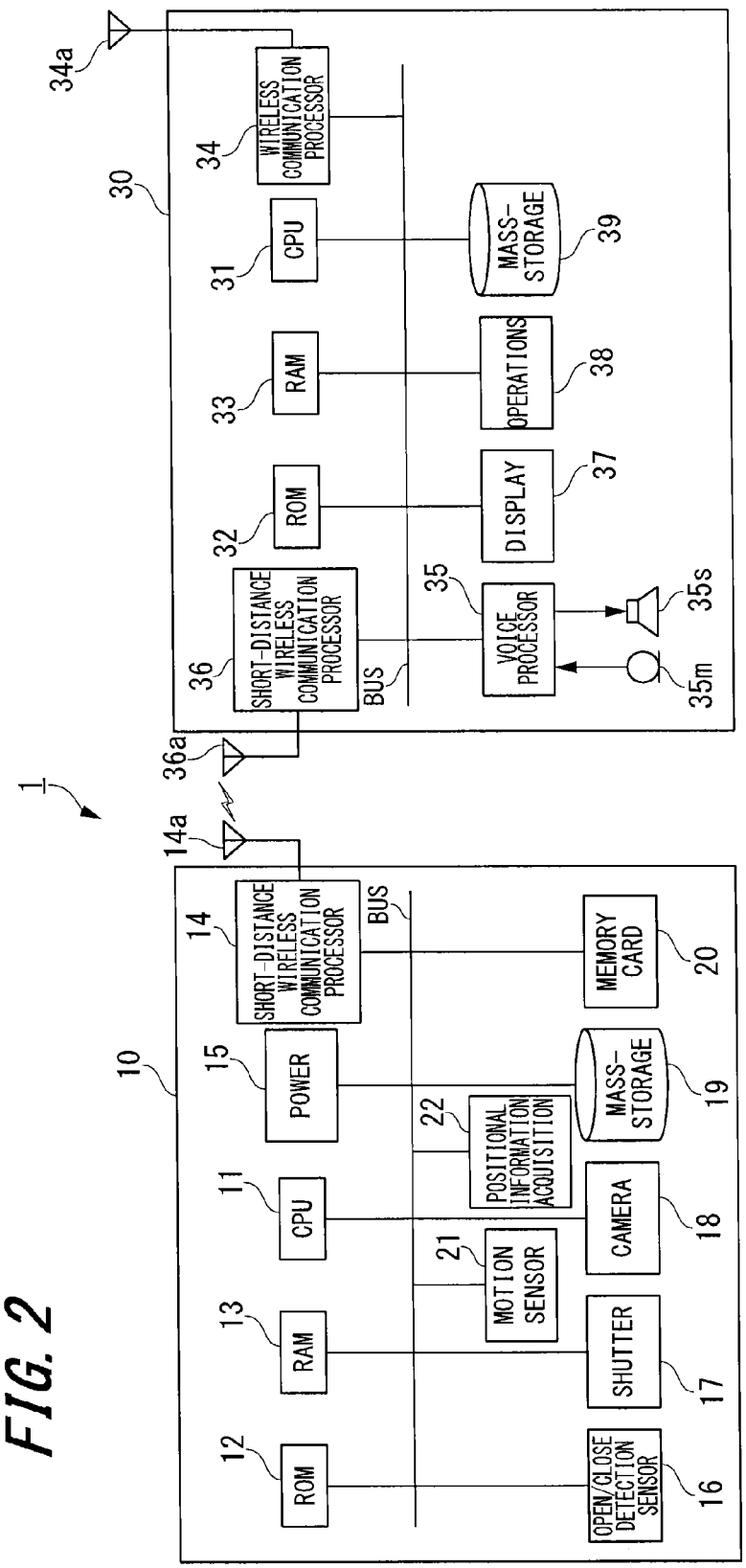

FIG. 3

| Photographing Mode | Capture | Created Video length | Use (Typical) |
|---|---|---|---|
| Diary | 1picture/30sec<br>Burst:2fps x5sec<br>Duration:Unlimited | 60sec | about120items |
| Active | 1picture/10sec<br>Burst:2fps x5sec<br>Duration:2hour | 30sec | about100items |
| Atmospheric | 1picture/1min<br>Burst:2fps x5sec<br>Duration:5hour | 60sec | about60items |
| Timelapse | 1picture/10min<br>Burst:2fps x5sec<br>Duration:10hour | 30sec | about60items |

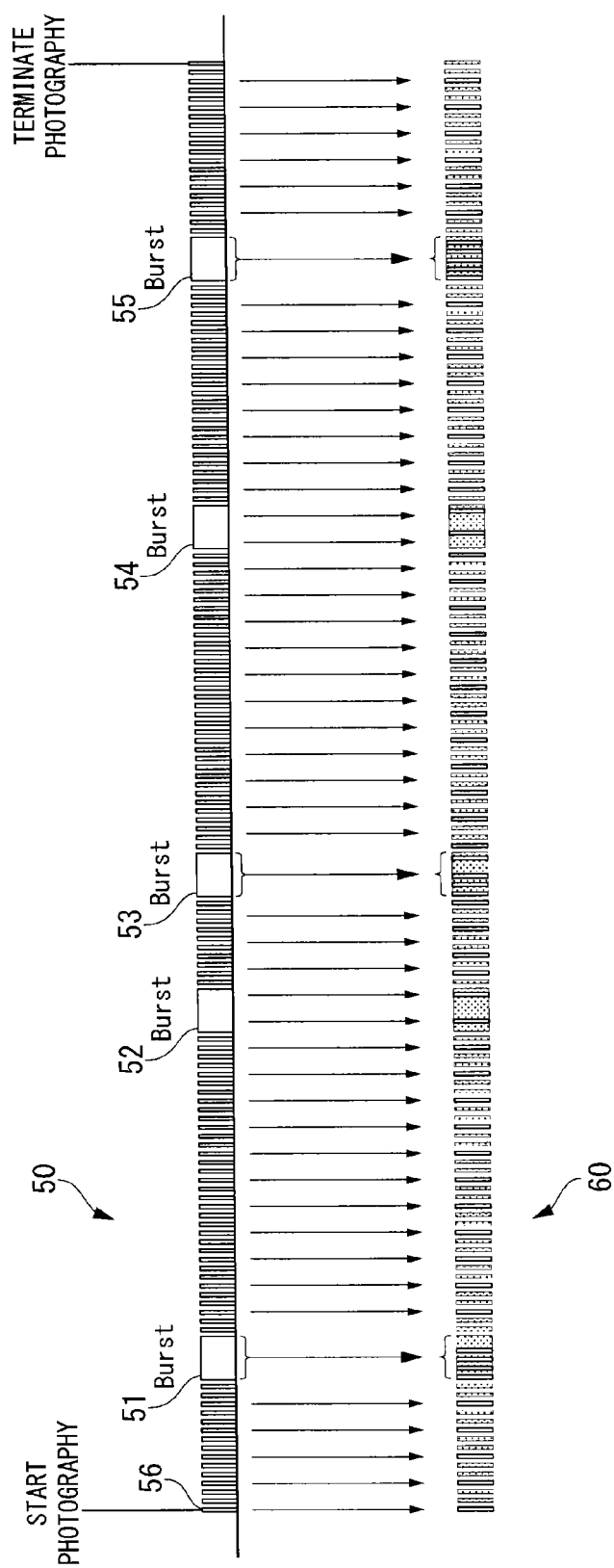

GENERATION OF A DIGEST VIDEO

BACKGROUND OF THE INVENTION

Field of the Invention

Devices, systems, and methods for generation of a digest video are described. In particular, an information processing system automatically generates a digest video using a communication device in communication with an imaging device.

Description of the Related Art

Many user devices are available for capturing a still or moving image. A user can view the photographed images using a monitor or television receiver connected to a personal computer.

A plurality of captured images can be reproduced by a computing system into a slide show. The slide show can be reproduced according to an order of the photographing or reproduced in a random order to display onto a display monitor. Music can also be added as an audio background to the slide show. Devices include mobile devices, such as a smart phone or a tablet, and also include wearable devices.

Electronic devices can be used to photograph with a certain fixed time interval, which can be stored as metadata with the photographed image. However, when several images are reproduced and displayed using a conventional slide show function, there can be too many image frames and/or it may take a long period of time to view the slide show.

SUMMARY OF THE INVENTION

Embodiments include an electronic device comprising circuitry configured to acquire data of a first group of one or more images photographed by a first photographing method with corresponding first attribute information and first photographing time, and acquire data of a second group of one or more images photographed by a second photographing method with corresponding second attribute information and second photographing time; assign a priority to the first group and the second group based on the first photographing method and the second photographing method, respectively; and select one or more images from the first group and the second group based upon the assigned priorities, wherein a time to continuously display the selected one or more images occurs within a pre-determined time range for a set display mode.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 1-2 are block diagrams illustrating exemplary information processing systems according to an embodiment;

FIG. 3 is a table illustrating photographing modes according to an embodiment;

FIG. 4 illustrates a recorded image group according to an embodiment;

Referring now to the drawings, wherein like reference numerals designate identical or corresponding parts throughout the several views.

DETAILED DESCRIPTION OF THE PREFERRED EMBODIMENTS

Figure 5:
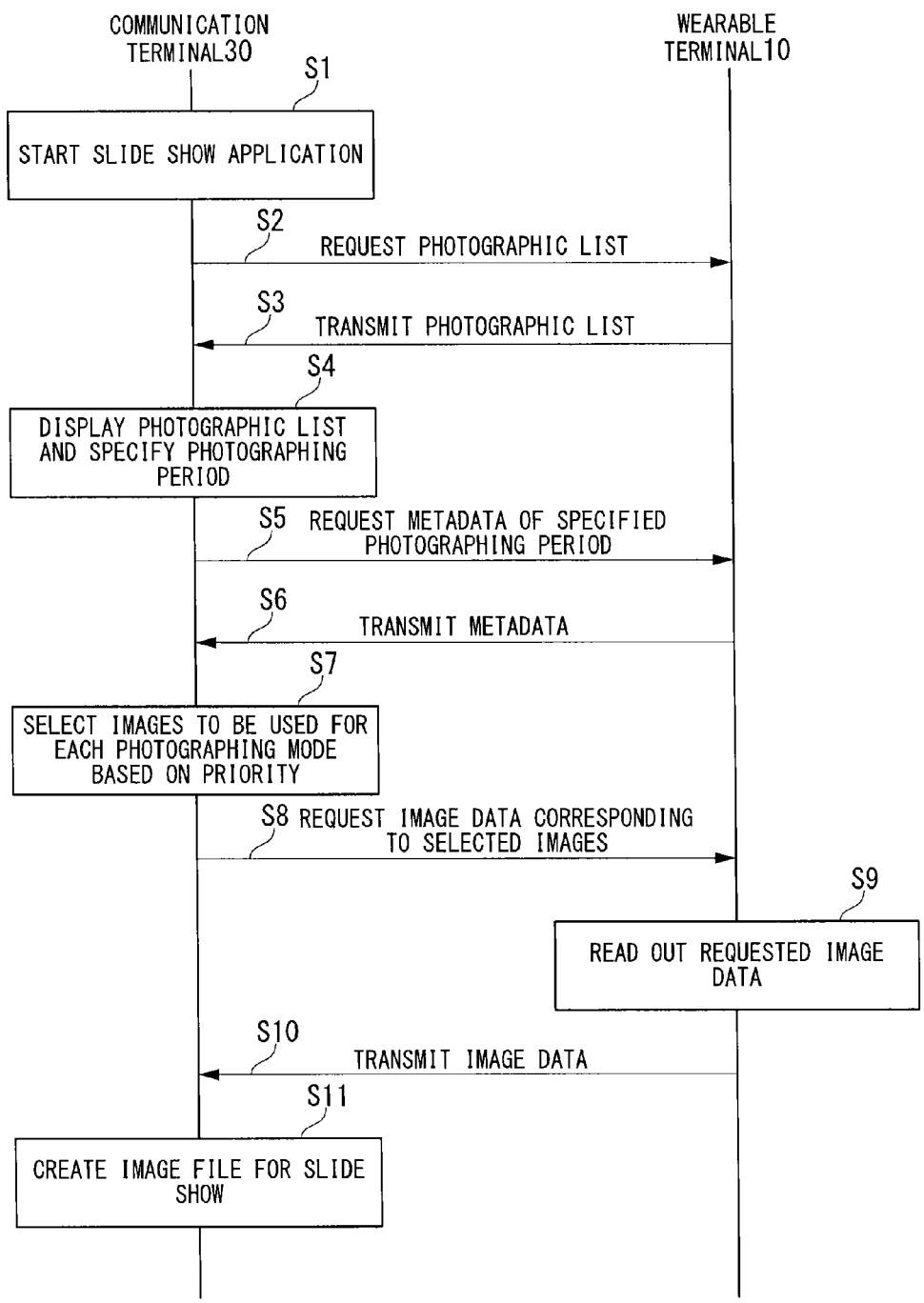
FIG. 5 illustrates an exemplary flowchart for a slide show production process according to an embodiment.

Embodiments herein describe an information processing system, method, and computer program, and an imaging user device. A pre-determined number of image frames can be selected from among several photographed images by assigning an evaluation value based on pre-determined evaluation criteria and selecting a set number of images based on a value hierarchy. However, the pre-determined selected images may not be the images a user would have selected. In addition, the total selected images may be incomplete or misunderstood and may not portray an intended message. Embodiments described herein provide a user's photographing intent by using a system and method of selecting desirable images from a large bulk of available images.

FIG. 1 is a block diagram illustrating an exemplary information processing system 1. Information processing system 1 includes a wearable user imaging device 10 and a communication device 30. In another embodiment, a camera control apparatus can be included with the communication device 30 and function as a single information processing system. In still another embodiment, wearable user imaging device 10 can be configured and equipped with the functions of communication device 30. Embodiments described herein for an information processing system 1 can be for two physically separate devices, i.e. wearable user imaging device 10 and communication device 30, or embodiments can be for a combined information processing system 1.

Communication device 30 includes, but is not limited to a smart phone and a table-type device. The wearable user imaging device 10 is configured to communicate with the communication device 30, and vice versa. Communication device 30 has a slide show function and is configured to display the slide show on a display component 37 using images that were photographed by wearable user imaging device 10.

Wearable user imaging device 10 can include a through-hole within a main body 10A in which a ring and strap can be attached. This would allow a user to carry the wearable user imaging device 10 around the neck or around the wrist of a user. In another embodiment, an adapter can be attached to the main body 10A, which is configured to be attached to a collar, belt, or pocket of a user's clothing.

At the front of wearable user imaging device 10, a sliding part 10S is configured to slide back and forth between an open state and a closed state. In an open state, sliding part 10S is located in a lower position of wearable user imaging device 10 to expose optical lens 18L in a ready image-capturing mode, as illustrated in FIG. 1. In a closed state, sliding part 10S covers optical lens 18L. In an embodiment, photographing can begin commencing when sliding part 10S moves to an open state from a closed state. Photographing is stopped when sliding part 10S is moved to a closed state from an open state.

Wearable user imaging device 10 is configured to capture still images or moving images, and stores the images in memory. A power button 15 and a shutter button 17 are arranged on a side surface of the main body 10A of the wearable user imaging device 10. When the sliding part 10S is positioned in an open state, a user can depress the shutter button 17 to capture a one-time still image manually. When the shutter button 17 is depressed down a longer time, a moving image of a pre-determined length of time can be captured manually. In addition, when a user performs a pre-determined action, such as a double tap on the shutter button 17 or on the side of the main body 10A, the wearable user imaging device 10 can capture still images continuously for a prescribed period of time. The continuous capturing of still images is referred to herein as burst photographing. In an embodiment, burst photographing of still images can occur ten times, for example, wherein continuous shooting of ten subsequent still images occurs.

FIG. 2 is a block diagram illustrating an exemplary information processing system 1 according to certain embodiments of the present disclosure. Communication device 30 is illustrated, which can be a smartphone, for example. However, the skilled artisan will appreciate that the features described herein can be adapted to be implemented on other devices (e.g., a laptop, a tablet, a server, etc.).

A Control Processing Unit (CPU) 31 controls each element in the communication device 30 to perform functions related to communication control, audio signal processing, control for the audio signal processing, still and moving image processing and control, and other types of signal processing. The CPU 31 can perform these functions by executing instructions stored in a memory. Alternatively or in addition to the local storage of memory, the functions can be executed using instructions stored on an external device accessed on a network or on a non-transitory computer readable medium.

The memory includes, but is not limited to Read Only Memory (ROM) 32, Random Access Memory (RAM) 33, or a memory array including a combination of volatile and non-volatile memory units. The memory can include a working memory by the CPU 31 while executing the processes and algorithms of the present disclosure. Additionally, the memory can include a mass storage 39.

Communication device 30 includes one or more communication bus lines. Control data to/from the CPU 31 can be transmitted through a control line, and a data line can be used for transmission of voice data, display data, etc.

An antenna 34a transmits/receives electromagnetic wave signals between base stations for performing radio-based communication, such as various forms of cellular telephone communication through a wireless communication processor 34. The wireless communication processor 34 controls communication performed between communication device 30 and other external devices via antenna 34a. For example, wireless communication processor 34 can control communication between base stations for cellular phone communication.

A speaker 35s emits an audio signal corresponding to audio data supplied from a voice processor 35. A microphone 35m detects surrounding audio and converts the detected audio into an audio signal. The audio signal is output to the voice processor 35 for further processing. The voice processor 35 demodulates and/or decodes the audio data read from the memory or audio data received by wireless communication processor 34 and/or a short-distance wireless communication processor 36. The short-distance communication processor 36 is connected to an antenna 36a.

The exemplary communication device 30 can also include a display 37 and operations 38, such as a touch panel and an operation key. The display 37 can be a Liquid Crystal Display (LCD), an organic electroluminescence display panel, or another display screen technology. In addition to displaying still and moving image data, the display 37 can display operational inputs, such as numbers or icons which can be used for control of the communication device 30. The display 37 can additionally display a GUI for a user to control aspects of the communication device 30 and/or other devices. Further, the display 37 can display characters and images received by the communication device 30 and/or stored in the memory or accessed from an external device on a network. For example, the communication device 30 can access a network such as the Internet and display text and/or images transmitted from a Web server.

The touch panel of operations 38 can include a physical touch panel display screen and a touch panel driver. The touch panel can include one or more touch sensors for detecting an input operation on an operation surface of the touch panel display screen. The touch panel also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel can detect when the stylus approaches/contacts the operation surface of the touch panel display (similar to the case in which a finger is used for the touch operation).

In certain aspects of the present disclosure, the touch panel can be disposed adjacent to the display 37 (e.g., laminated) or can be formed integrally with the display 37. For simplicity, the present disclosure assumes the touch panel of operations 38 is formed integrally with the display 37 and therefore, examples discussed herein can describe touch operations being performed on the surface of the display 37 rather than the touch panel. However, the skilled artisan will appreciate that this is not limiting.

For simplicity, the present disclosure assumes the touch panel is a capacitance-type touch panel technology. However, it should be appreciated that aspects of the present disclosure can easily be applied to other touch panel types (e.g., resistance-type touch panels) with alternate structures. In certain aspects of the present disclosure, the touch panel can include transparent electrode touch sensors arranged in the X-Y direction on the surface of transparent sensor glass.

The touch panel driver can be included in the touch panel of operations 38 for control processing related to the touch panel, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that may be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in certain embodiments, the touch panel can detect a position of a user's finger around an edge of the display panel (e.g., gripping a protective case that surrounds the display/touch panel). Signals can be transmitted by the touch panel driver, e.g. in response to a detection of a touch operation, in response to a query from another element based on timed data exchange, etc.

The touch panel of operations 38 and the display 37 can be surrounded by a protective casing, which can also enclose the other elements included in the communication device 30. In certain embodiments, a position of the user's fingers on the protective casing (but not directly on the surface of the display 37) can be detected by the touch panel sensors. Accordingly, the CPU 31 can perform display control processing described herein based on the detected position of the user's fingers gripping the casing. For example, an element in an interface can be moved to a new location within the interface (e.g., closer to one or more of the fingers) based on the detected finger position.

Further, in certain embodiments, the CPU 31 can be configured to detect which hand is holding the communication device 30, based on the detected finger position. For example, the touch panel sensors can detect a plurality of fingers on the left side of the communication device 30 (e.g., on an edge of the display 37 or on the protective casing), and detect a single finger on the right side of the communication device 30. In this exemplary scenario, the CPU 31 can determine that the user is holding the communication device 30 with his/her right hand because the detected grip pattern corresponds to an expected pattern when the communication device 30 is held only with the right hand.

The operation key of operations 38 can include one or more buttons or similar external control elements, which can generate an operation signal based on a detected input by the user. In addition to outputs from the touch panel, these operation signals can be supplied to the CPU 31 via the bus line for performing related processing and control. In certain aspects of the present disclosure, the processing and/or functions associated with external buttons and the like can be performed by the CPU 31 in response to an input operation on the touch panel display screen rather than the external button, key, etc. In this way, external buttons on the communication device 30 can be eliminated in lieu of performing inputs via touch operations, thereby improving water-tightness.

The antenna 34a can transmit/receive electromagnetic wave signals to/from other external apparatuses, and the short-distance wireless communication processor 36 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 36.

The communication device 30 can include a motion sensor. The motion sensor can detect features of motion (i.e., one or more movements) of the communication device 30. For example, the motion sensor can include an accelerometer to detect acceleration, a gyroscope to detect angular velocity, a geomagnetic sensor to detect direction, a geolocation sensor to detect location, etc., or a combination thereof to detect motion of the communication device 30. In certain embodiments, the motion sensor can generate a detection signal that includes data representing the detected motion. For example, the motion sensor can determine a number of distinct movements in a motion (e.g., from start of the series of movements to a stop, within a predetermined time interval, etc.), a number of physical shocks on the communication device 30 (e.g., a jarring, hitting, etc., of the user device), a speed and/or acceleration of the motion (instantaneous and/or temporal), or other motion features. The detected motion features can be included in the generated detection signal. The detection signal can be transmitted, e.g., to the CPU 31, whereby further processing can be performed based on data included in the detection signal. The motion sensor can work in conjunction with Global Positioning Systems (GPS). The GPS can detect the present position of the communication device 30. The information of the present position detected by the GPS is transmitted to the CPU 31. An antenna is connected to the GPS for receiving and transmitting signals to and from a GPS satellite.

FIG. 2 also illustrates features of the wearable user imaging device 10, such as a wearable imaging camera device. Wearable user imaging device 10 includes a CPU 11, ROM 12, and RAM 13, with features and capabilities similar to CPU 31, ROM 32, and RAM 33 of communication device 30. Short-distance wireless communication processor 14 and associated antenna 14a are configured to communicate with short-distance wireless communication processor 36 and associated antenna 36a of communication device 30, as well as other nearby wireless devices. Short-distance wireless communication processor 14 transmits and receives radio signals under control of CPU 11. In an embodiment for illustrative purposes only, short-distance wireless communication processors 14 and 36 can communicate wirelessly within a range of approximately 10-100 meters. CPU 11 is an arithmetic processing unit. Programs executed and data used by CPU 11 are stored in ROM 12, which are read through a bus line.

Wearable user imaging device 10 also includes a power control 15, such as an on/off power button, which supplies power to each of the hardware components of the wearable user imaging device 10 from a battery. An open/close detection sensor 16 detects whether the sliding part 10S is in an open or closed state and outputs a detection signal to CPU 11. When CPU 11 determines the sliding part 10S is in an open position, CPU 11 can be configured to automatically photograph for a fixed time interval according to a selected photographing mode in which a camera 18 has been set. A shutter control 17 allows manual control of photographing operations. When the shutter control 17 is depressed, CPU 11 outputs a control signal to camera 18 to photograph a still or moving image.

Camera 18 is an image data acquisition hardware component and includes an optical system, such as an optical lens to guide light to an image pick-up element. The image pick-up element has pixels to photo-electrically convert an electrical signal output from the image pick-up element to an image signal. Camera 18 can read a photographing parameter of a designated photographing mode from a photographing mode table stored in ROM 12 and controlled by CPU 11. The photographing mode table includes items, such as a kind of photographing mode, classification of the image to periodically record, an imaging time interval, and an imaging time in the case of a moving image.

Wearable user imaging device 10 also includes mass storage 19 of captured images, as well as a memory card 20. A motion sensor 21 and a positional information acquisition 22 are included in the wearable user imaging device 10, the data of which can be included with associated image data.

When photographing is initiated from CPU 11, the camera 18 reads a photographing parameter of the designated photographing mode from the photographing mode table. Data from captured images are stored in mass storage 19 until the sliding part 10S moves to a closed state. Metadata showing the attribute of the image is added to the image data stored in mass storage 19. For example, content of the metadata added to an image could be photographing mode, photographing time, an imaging method, and the classification of a still or moving image. An imaging method could be a periodic recording, a burst photographing, or a manual photographing. Memory card 20 performs a read-out of the data of the contents of the memory card 20.

Positioning information can be matched or linked with the image metadata. Images stored by mass storage 19 can be transmitted to the communication device 30 via CPU 11 either regularly or as a transmission command from the communication device 30. Motion sensor 21 acquires sensor data from motion of the wearable user imaging device 10 and outputs the detected values to CPU 11. For example, an acceleration sensor can be used for motion sensor 21. When a triaxial acceleration sensor is used, an acceleration sensor outputs regularly the acceleration value of an x-axis, a y-axis, and a z-axis. CPU 11 controls each hardware component according to the detected value of motion sensor 21. In another example, when it is determined that wearable user imaging device 10 was double-tapped from a tri-axial detected value of motion sensor 21, CPU 11 performs burst photographing. A gyro sensor and/or a geomagnetic sensor can also be used in addition to an acceleration sensor for motion sensor 21. The position information acquisition 22 detects the position of the wearable user imaging device 10 and outputs a detection result to CPU 11. A GPS sensor can be used as the positional information acquisition 22, where positional information is represented by the latitude and the longitude. The information of a near position of the wearable user imaging device 10 is obtained based on a radio signal transmitted from communication device 30.

In an embodiment, the information processing system 1 can be a combined unit of the communication device 30 with the wearable user imaging device 10. In such an embodiment, the communication device 30 may include a camera section, which includes a lens and shutter for capturing photographs of the surroundings around the communication device 30. In an embodiment, the camera section captures surroundings of an opposite side of the communication device 30 from the user. The images of the captured photographs can be displayed on the display 37. A memory section saves the captured photographs. The memory section can reside within the camera section. The camera can be a separate feature attached to the communication device 30 or it can be a built-in camera feature.

An image selection algorithm can select an image from many different captured images that are stored in the wearable user imaging device 10. A slide show mode table is stored in ROM 32, wherein the slide show mode table can include a kind of slide show mode, classification of the image to be displayed, the display time for each classification of an image, the presence or absence of an effect, or the kind of an applied effect.

FIG. 3 is a table illustrating photographing modes used with embodiments described herein. Four modes will be discussed for illustrative purposes. However, several other modes can be used in conjunction with embodiments described herein and will be apparent to those of skill in the art. In addition, values given for different modes are given for illustrative purposes only and are not intended to be restricted to those given values. Other values will be apparent to those of skill in the art.

A Diary mode can be used for recording a user's actions for a period of time, such as one day. It can be used to capture everyday situations, for example. In Diary mode, a still image can be taken once every thirty seconds (1 frame per 30 sec). In burst photographing, a still image can be taken at a rate of two frames per second over a five-second period (2 fps*5 sec). There does not need to be an upper limit in session duration. The reproduction time of a slide show in Diary mode can be sixty seconds in length, for example. Approximately 120 images can be used for display of a slide show.

An Active mode can be used to record an activity or hobby, for example. A still image can be taken once every ten seconds (1 frame per 10 sec). In burst photographing, a still image can be taken at a rate of two frames per second over a five-second period (2 fps*5 sec). An Active mode can be taken for a maximum session of two hours. The reproduction time of a slide show in Active mode can be thirty seconds in length, for example. Approximately 100 images can be used for display of the slide show.

An Atmospheric mode can be used to record an immediate atmosphere through a moving image. A moving image can be taken every minute (1 video per 1 min). In burst photographing, a still image is taken at a rate of two frames per second for a five-second period (2 fps*5 sec). A photographing session in Atmospheric mode can be for a maximum of five hours. The reproduction time of a slide show can be sixty seconds in length, for example. Approximately sixty images can be used for display of an Atmospheric mode slide show.

A Timelapse mode can be used to record a regular event of a longer time interval. A still image can be taken once every ten minutes (1 frame per 10 min). In burst photographing, a still image can be taken at a rate of two frames per second for a five-second period (2 fps*5 sec). A maximum session of ten hours can be set. The reproduction time of a Timelapse slide show can be thirty seconds in length, for example. Approximately sixty images can be used for display of the slide show.

FIG. 4 illustrates selection of images and image groups from a plurality of captured images in a Diary mode. Metadata showing the attribute of each image is added to the still or moving image data. The attribute information determines a type of imaging method to be used in which a priority is associated with each image. Images with a high priority are preferably used for a slide show. In an embodiment, metadata for an image designated as a high priority can have a flag set in the priority item of the metadata for the associated image(s). In addition, display types, such as a display time and an effect can be designated for each image at the time of display in the slide show. A display time is selected for each type of mode for a slide show. The display type of each image can be based on the priority at the time of a slide show.

FIG. 4 illustrates a recorded image group 50, which contains image groups 51-55, in which some images were captured as still images. Other still images 56 were periodically recorded, while some still images were captured as a burst photographing. Images that were captured as a burst image group can be described as a "burst still image." Selected image group 60 includes images that were selected from the recorded image groups 50 based on a priority of each image contained in their associated metadata for use in a slide show.

Image selection for a Diary mode provides a priority for a burst still image, along with manually-captured images. Since the images were preferentially selected as images taken by a user during recording, a user's mood, feelings, or intended message can be captured. Therefore, user-selected images have a higher priority for final selection. However, priority selection can be changed at a user's discretion.

For a Diary mode selection, a photographing session can include images selected according to an image selection algorithm to produce a sixty-second movie. In an embodiment, a Diary mode image selection algorithm can include: 1) normal images of 0.5 sec per 1 frame; 2) burst images of 1.0 sec per 1 frame, (priority is given; use five of ten frames; use three bursts); 3) a manual movie of 5 sec (priority is given; use three movies); and 4) manual pictures of 0.5 sec per 1 frame (priority is given). Other selection criteria and values are contemplated by embodiments described herein.

For a burst image group, a pre-determined number, e.g. five of ten frames is taken from the ten consecutive recorded frames. Each still image of the burst image group is displayed for one second during the slide show display. The number of burst image groups used can be a maximum of three groups. The burst image groups are selected such that each group is displayed temporally in equal intervals within the total slide show display time.

An embodiment is given to illustrate a video organization scheme that can be used with embodiments described herein. Within a range of time over the slide show, still manually-captured images are selected as much as possible, since those are usually of higher interest to the user. A still manually-captured image is displayed for 0.5 seconds per frame. When any display time of the slide show remains, images of periodic normal recording are selected at equal temporal intervals within the slide show. Preferentially selected images are used first, followed by periodic normal images.

The illustrated video organization scheme also includes moving images of a burst image group, as well as manually-captured moving images of a movie group. A maximum number for each group could be set at three for the slide show. In FIG. 4, there are five burst image groups 51-55 included in the recorded image group 50. Three burst image groups 51, 53, and 55 are selected at equally-spaced temporal intervals where possible. Five still images are selected from the ten consecutive images of each burst image group. In addition, some still images 56 periodically recorded at equal intervals outside of the burst image groups 51, 53, and 55 are selected. The selected image group 60 used for the slide show contains some still images 56 periodically recorded at equal intervals, along with still images selected from the burst image groups 51, 53, and 55 (a total of fifteen selected frames of burst image frames). As a result, a slide show containing a good balance is produced.

FIG. 4 illustrates two burst image groups 52 and 54 that were not selected for display as a burst image group. However, a pre-determined number of still images (two frames, for example) can be used from the ten consecutive images within each burst image group 52 and 54 that were not selected for display as a burst image group. As a result images from the non-selected burst image groups can still be included in the slide show. This provides some continuity for an overall experience displayed in the slide show.

Selection of additional images to fill in the remaining time slots of the slide show can be determined as follows for a sixty-minute slide show. One periodic recording can be displayed every ten seconds. Three burst photographing groups and twenty manually-captured still images are used. The total display time for burst image groups=1 sec×5 frames×3 groups=15 sec. The total display time for a manually photographed movie=5 sec×3 frames=15 sec. The total display time for still manually-captured images=0.5 sec×20 frames=10 sec. Therefore, the total display time of preferentially-selected still and moving images is forty seconds (15+15+10=40). This leaves twenty additional seconds, where a total desired display time is sixty seconds, and forty seconds have been accounted for up to this point. As a result, twenty seconds of remaining time will be accounted for with equal intervals of periodically-recorded images and images from non-selected burst image groups 52 and 54.

Variations of the slide show organization scheme described above are also contemplated by embodiments described herein. If the total number of image frames of burst photographing is small, all images of burst photographing can be used. Periodic recorded images can be used at suitably equal intervals temporally over the total slide show display time in between the burst photographed images. Likewise, if the total number of manually-captured images is small, all of those images can be used with periodic recorded images filled in between. In contrast, all recorded periodic images can be used when a small number of periodic images are present. Images other than periodic images can be used at suitable intervals in between the periodic images. In another embodiment, when the total number of images is short compared to the total desired display time, the communication device 30 can be faded out before the ending time of the slide show.

FIG. 5 illustrates an exemplary flowchart for a slide show production process using communication device 30 and wearable user imaging device 10. CPU 31 of communication device 30 executes a program stored in ROM 32, while CPU 11 of the wearable user imaging device 10 executes a program stored in ROM 12. In step S1, communication device 30 receives a user operation and initiates a slide show application.

In step S2, communication device 30 requests a photographic list from wearable user imaging device 10. A photographing session can be described by the photographic list. Step S2 can be initiated at the time in which communication device 30 requests the photographic list or the time in which the power of the communication device 30 is turned on. In step S3, the wearable user imaging device 10 transmits the photographic list stored in mass storage 19 to the communication device 30.

In step S4, the communication device 30 displays the photographic list received from the wearable user imaging device 10 on display 37. In step S5, the communication device 30 requests the metadata of the recorded image group contained in the photographing session, from wearable user imaging device 10. In step S6, wearable user imaging device 10 transmits the metadata of the designated photographing session to communication device 30. When a user designates the photographing session in step S4, wearable user imaging device 10 transmits the metadata of all designated sessions to communication device 30.

In step S7, communication device 30 selects an image to be used for a slide show, based on a priority set for every photographic mode from the recorded image groups, described by the metadata received from wearable user imaging device 10. In step S8, communication device 30 requests the data of the image corresponding to a selected image or selected image group of the wearable user imaging device 10. Communication device 30 selects an image from the recorded image groups described by the metadata corresponding to each photographing session. When the metadata of one or more photographing sessions has been sent, the data of the selected image is requested from wearable user imaging device 10 for every photographing session.

In step S9, wearable user imaging device 10 reads the data of the image of a selected image group from mass storage 19. In step S10, wearable user imaging device 10 transmits the data of the image of the selected image group to the communication device 30. In step S11, communication device 30 receives the data of the image of a selected image group transmitted from wearable user imaging device 10, matches it with the photographing session, and stores it at mass storage 39. Communication device 30 creates the image file for slide show using the data of the image of the received selected image group.

Communication device 30 creates an image file for a resultant slide show in the following exemplary process. Communication device 30 sets the display time of a still image periodically recorded, a moving image, a still image which was part of burst photographing, and a still image and moving image from manually-captured photographing contained in the image file. Communication device 30 sets an effect to the image used for a slide show according to a selected photographing mode. When the image file for the slide show is created, communication device 30 switches an image one by one to display the slide show on display 37. Alternatively, communication device 30 stores the created image file for the slide show in mass storage 39.

Figure 6:
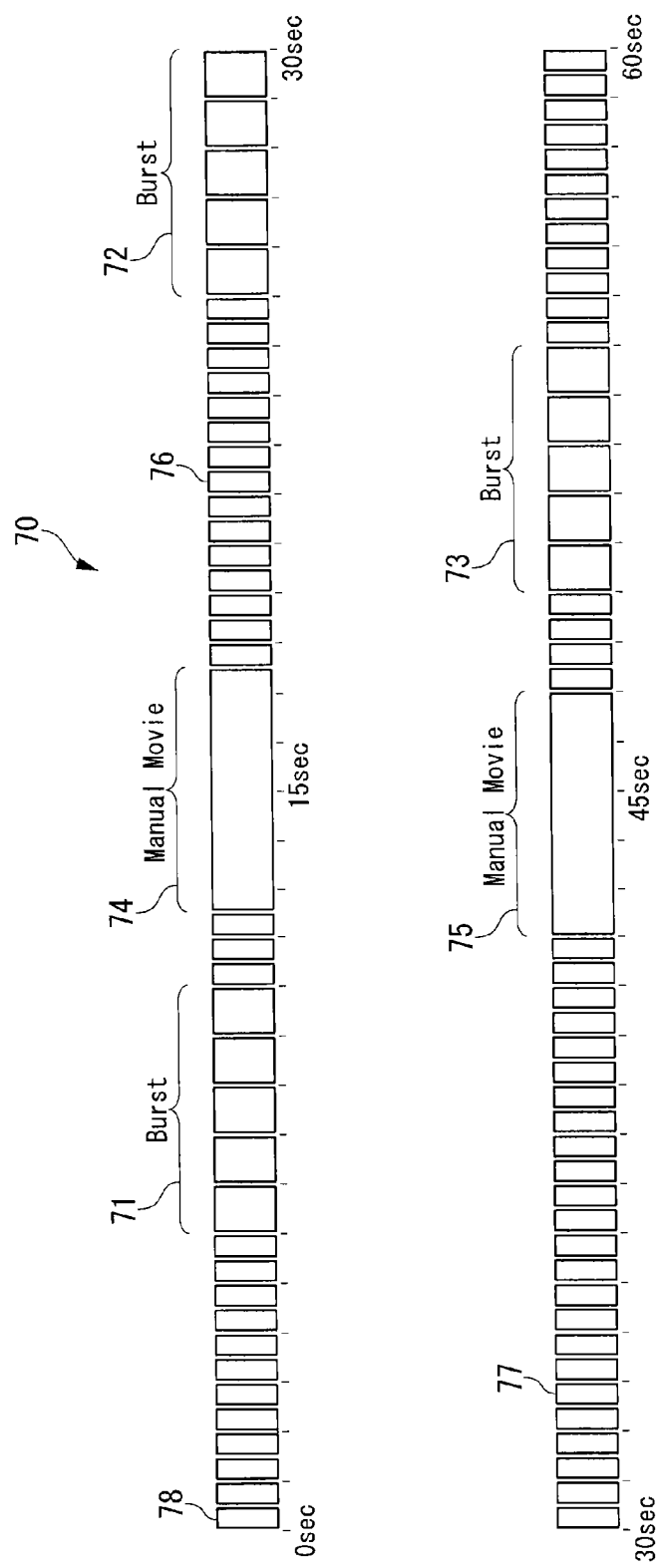
FIGS. 6-7 illustrate exemplary image files for a slide show according to an embodiment.

FIG. 6 illustrates an exemplary image file for a slide show in Diary mode. The display time of the slide show can be sixty seconds. However, other slide show display times can be used. In Diary mode, a still or moving image of a burst image group and a manually-captured photographed movie is preferentially displayed. Image file 70 for the slide show includes three burst image groups 71-73 in which burst photographing was implemented, two moving images 74 and 75 of manually-captured moving photographs, two still images 76 and 77 of manually-captured frames, and some still images 78 periodically recorded. In Diary mode, the display time of one burst still image can be 1.0 second and a moving image of a manually-captured photographed movie can be five seconds. A still image of manually-captured photographing and periodic recording can be 0.5 seconds per frame.

Figure 7:
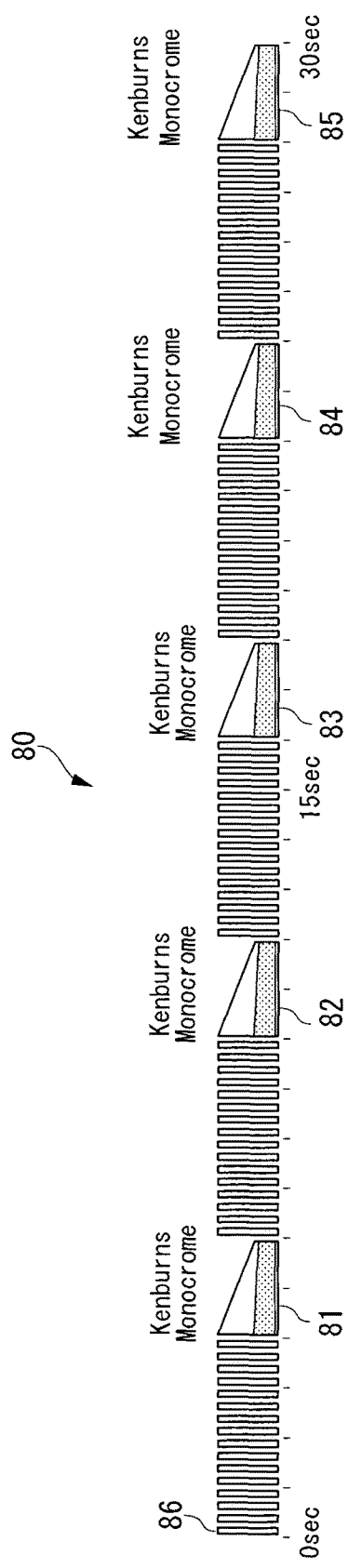

FIG. 7 illustrates an exemplary image file for a slide show in Active mode. The display time of a slide show in Active mode can be thirty seconds, as an example. In Active mode, a burst image group and a still image of manually-captured photographing are preferentially displayed. A moving image of manual photographing is not used. The image file 80 for the slide show includes some still images 86 that were periodically recorded.

FIG. 7 illustrates five effect periods 81-85 set at a total time of thirty seconds, as an example. The effect periods 81-85 are set every seven seconds, and each effect period is two seconds in length. A "Ken Burns" and a "monochrome" effect are used. Ken Burns is a visual effect of the pan and zoom which moves to an end position from a designated starting position. It runs simultaneously with a monochrome display with the effect periods 81-85, where pan and zoom by Ken Burns is performed.

FIG. 7 is an example in which effect periods 81-85 are set in synchronization with a characteristic session of music with a hook session and a building-up portion. In the photographing session, the image corresponding to the characteristic session of music is temporally selected as an image of desired effect. In this example, one image is assumed as an image displayed on one effect period. For example, one burst still image is selected from a burst image group as an effect image, wherein an effect is given for two seconds and the selected image is displayed. A still manually-captured image can also have a selected effect, such as the above-described music.

Multiple images can be displayed in one effect period. For example, when displaying two images within an effect period for two seconds, it will display each image for one second. The length of an effect period is not limited to two seconds; other effect period time intervals can be used with embodiments described herein.

An example will be given for an image selection algorithm in Active mode. In an embodiment, Active mode slide show has a duration of thirty seconds. A normal or periodic frame has a display time of 0.25 sec per one frame. A burst image group is 0.25 sec per one frame, where priority is given and one item from ten items is selected, and one burst group is used. A manually-captured movie is not used. A manually-captured still image is displayed 0.25 sec per one frame and is given priority. Other criteria include a burst still image having two or three frames selected from the total ten consecutive frames. When selecting a pre-determined number of burst still images, it may be desirable to use a characteristic still image of sufficient image quality. In addition, one or more still images of a burst image group and a manually-captured photographing session can be used for a slide show. In addition, the effect period in a slide show does not need to be synchronized with music.

An example will be given for an image selection algorithm in Atmospheric mode. Only a moving image may be displayed for a slide show in Atmospheric mode in an embodiment. The display time can be set at sixty seconds. A moving image of manually-captured photographing can have a preferential display, whereas a still image of a burst image group and manually-captured photographing may not be used. A periodically recorded moving image can also be used. The display time of one moving image from a manually-captured photographing can be five seconds. The display time of one moving image periodically recorded can be one second. An embodiment for an image selection algorithm in Atmospheric mode can include a sixty second movie having normal periodic frames of one sec per frame. Burst photographing may not be used. A manually-captured movie can be displayed at five sec per one frame and can be given priority. A manually-captured frame is not used. The number of moving images of manual photographing which can be used for a slide show has limitations similar to other modes.

An example will be given for an image selection algorithm in Timelapse mode. An exemplary slide show in Timelapse mode can be thirty seconds. Only one burst image group may be displayed immediately after the slide show start. This may be sufficient, since all still images (for example, all ten frames of the burst image group) are used. If time still remains, other periodic images can be displayed, whereas a moving image of manual photographing may not be used. A still image of manual photographing is preferentially used. The display time of one burst still image can be 0.5 seconds. The effect of Ken burns can be repeatedly implemented at a pre-determined time interval immediately after a start of the slide show, such as five-second time intervals. Another effect, such as a faded color tone can be implemented in parallel with a Ken Burns effect. The image size can change from 100% to 80% in five seconds, and a color tone change can fade from black to a full color or vice versa with a Ken Burns effect.

An example image selection algorithm in Timelapse mode can include a timed movie of thirty seconds and include normal or periodic images at 0.5 sec per frame. A burst image display of 0.5 sec per frame has a priority, and one burst group can be used. A manually produced movie may not be used. Manual still pictures at 0.5 sec per frame can be used and are given priority.

Figure 8:
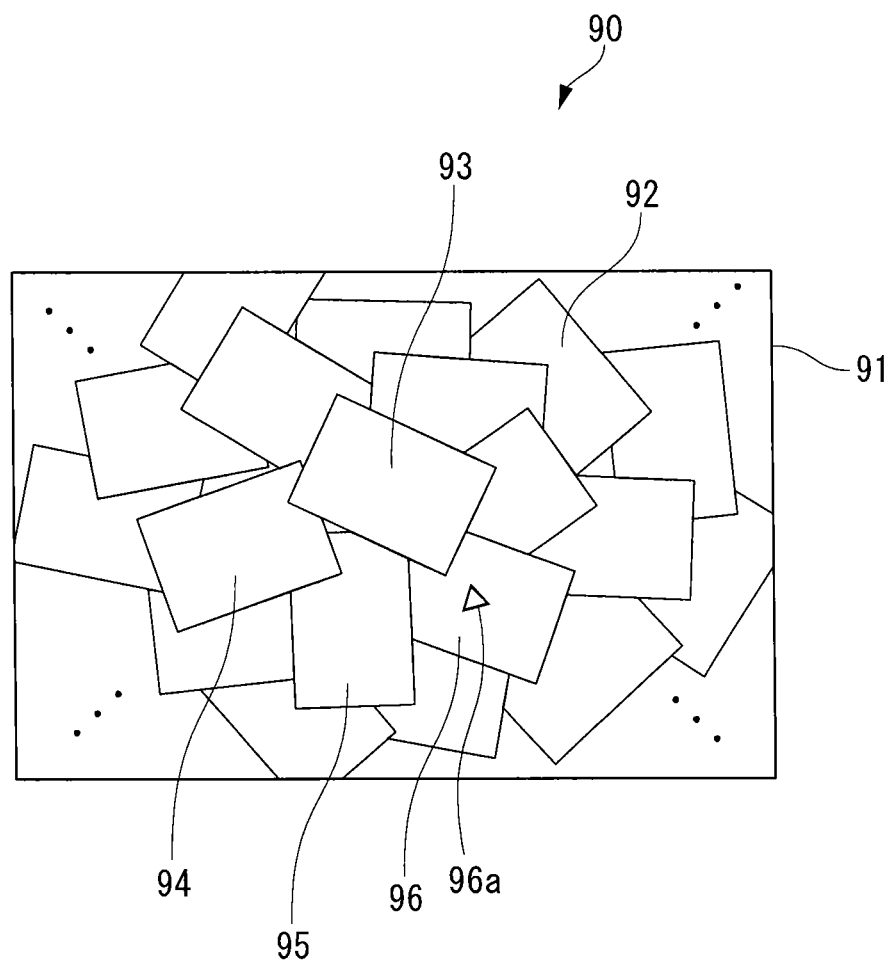
FIG. 8 illustrates a scrapbook display according to an embodiment.

FIG. 8 illustrates a scrapbook display that can be used in conjunction with embodiments described herein. A scrapbook 90 has an image display region 91 with several images arranged upon it. A still image of a burst image group and a still image of a manually-captured photographing are preferentially arranged in a top layer and within the center of image display region 91. In FIG. 8, still image 93 of burst photographing is arranged in the central region of the topmost layer. A still image of fine image quality is selected. Still image 94 is a still image of manually-captured photographing, for example. Still image 95 is another still image of burst photographing. Still image 95 could belong to the same burst image group as still image 93, or it could belong to another burst image group.

A moving image can be displayed in a scrapbook format also. For example, still image 96 located in a layer beneath still images 93-95 is captured as a still image from one scene of a moving image. Reproduction button 96a is displayed on the still image 96. When a user touches the reproduction button 96a, communication device 30 will reproduce a moving image. Still image 92 of a periodic recording has a lower priority and is therefore arranged at a lower layer within the scrapbook display. In a scrapbook format, many layers overlap, and so the superiority or inferiority may be decided according to pre-determined priorities.

Numerous modifications and variations of the present invention are possible in light of the above teachings. The embodiments described with reference to the drawings may be practiced individually or in any combination thereof. It is therefore to be understood that within the scope of the appended claims, the embodiments may be practiced otherwise than as specifically described herein.

The functions, processes, and algorithms described herein may be performed in hardware or software executed by hardware, including computer processors and/or programmable processing circuits configured to execute program code and/or computer instructions to execute the functions, processes, and algorithms described herein. A processing circuit includes a programmed processor, as a processor includes circuitry. A processing circuit also includes devices such as an application specific integrated circuit (ASIC) and conventional circuit components arranged to perform the recited functions.

The functions and features described herein may also be executed by various distributed components of a system. For example, one or more processors may execute these system functions, wherein the processors are distributed across multiple components communicating in a network. The distributed components may include one or more client and/or server machines, in addition to various human interface and/or communication devices (e.g., display monitors, smart phones, tablets, personal digital assistants (PDAs)). The network may be a private network, such as a LAN or WAN, or may be a public network, such as the Internet. Input to the system may be received via direct user input and/or received remotely either in real-time or as a batch process. Additionally, some implementations may be performed on modules or hardware not identical to those described. Accordingly, other implementations are within the scope that may be claimed.

It is noted that, as used in the specification and the appended claims, the singular forms "a," "an," and "the" include plural referents unless the context clearly dictates otherwise.

The above disclosure also encompasses the embodiments noted below.

(1) An electronic device comprising circuitry configured to acquire data of a first group of one or more images photographed by a first photographing method with corresponding first attribute information and first photographing time, and acquire data of a second group of one or more images photographed by a second photographing method with corresponding second attribute information and second photographing time; assign a priority to the first group and the second group based on the first photographing method and the second photographing method, respectively; and select one or more images from the first group and the second group based upon the assigned priorities, wherein a time to continuously display the selected one or more images occurs within a pre-determined time range for a set display mode.

(2) The electronic device according to (1), wherein the circuitry is further configured to assign a higher priority to the second group photographed by the second photographing method, and preferentially select one or more images from the second group.

(3) The electronic device according to any one of (1) to (2), wherein the circuitry is further configured to select a plurality of images from the first group periodically photographed by the first photographing method, wherein the selected plurality of images are temporally evenly spaced within the pre-determined time range for the continuous display.

(4) The electronic device according to any one of (1) to (3), wherein the circuitry is further configured to select a pre-determined number of images from the second group when the second photographing method includes a continuous sequential capturing of multiple images for a specified time based on a pre-determined user action, wherein the selected pre-determined number of images are temporally evenly spaced within the pre-determined time range for the continuous display.

(5) The electronic device according to any one of (1) to (4), wherein the circuitry is further configured to set an upper limit to a number of selected images from the second group photographed by the second photographing method.

(6) The electronic device according to any one of (1) to (5), wherein the circuitry is further configured to assign priority to the first group and the second group for each photographing mode based upon the first photographing method and the second photographing method, respectively.

(7) The electronic device according to any one of (1) to (6), wherein the photographing mode includes one or more of a diary mode, an active mode, an atmospheric mode, or a timelapse mode.

(8) The electronic device according to any one of (1) to (7), wherein the first photographing method and the second photographing method include one or more manually photographed still images, a manually photographed burst of consecutive images, or periodically captured still images.

(9) The electronic device according to any one of (1) to (8), wherein the electronic device includes a camera configured to photograph images and output image data to an image processor.

(10) An information processing system comprises a photographing device having circuitry configured to capture a first group of one or more images using a first photographing method, record into storage attribute information of the first photographing method and photographing time as attributes associated with the first group, capture a second group of one or more images using a second photographing method, and record into the storage attribute information of the second photographing method and photographing time as attributes associated with the second group. The information processing system also comprises an information processing device having circuitry configured to acquire the attributes of the first group and the second group, assign a priority to the first group and the second group based on the first photographing method and the second photographing method, respectively, and select one or more images from the first group and the second group based upon the assigned priorities, wherein a time to continuously display the selected one or more images occurs within a set time range for a set display mode.

(11) The information processing system according to (10), wherein the first photographing method and the second photographing method include one or more of manually photographed still images, a manually photographed burst of consecutive images, or periodically captured still images.

(12) The information processing system according to (10) or (11), wherein the pre-determined display mode includes one or more of a diary mode, an active mode, an atmospheric mode, or a timelapse mode.

(13) The information processing system according to any one of (10) to (12), wherein the information processing device circuitry is further configured to temporally assign images of a higher priority within the pre-determined time range, and assign images of a lower priority within remaining time slots to provide the continuous display of the selected one or more images.

(14) The information processing system according to any one of (10) to (13), wherein the first photographing method includes photography sessions of a pre-determined time interval, and the second photographing method includes one or more manually-captured photography sessions.

(15) The information processing system according to any one of (10) to (14), wherein the second photographing method includes a continuous capture of multiple consecutive images for a specified time according to a pre-determined user action.

(16) The information processing system according to any one of (10) to (15), wherein the second photographing method includes one or more still images or one or more moving images captured according to user input operations.

(17) The information processing system according to any one of (10) to (16), wherein the photographing time of the first photographing method and the second photographing method are pre-determined.

(18) A method of selecting and displaying images, the method comprises acquiring data of a first group of one or more images photographed by a first photographing method with corresponding first attribute information and first photographing time; acquiring data of a second group of one or more images photographed by a second photographing method with corresponding second attribute information and second photographing time; assigning a priority to the first group and the second group based on the first photographing method and the second photographing method, respectively; and selecting one or more images from the first group and the second group based upon the assigned priorities, wherein a time to continuously display the selected one or more images occurs within a pre-determined time range for a set display mode.

The invention claimed is:

1. An electronic device, comprising:
   circuitry configured to
      acquire data for a first group of photographed images having corresponding first attribute information and first photographing time;
      acquire data for a second group of photographed images having corresponding second attribute information and second photographing time;
      assign a priority to the first group based on the first attribute information and the first photographing time;
      assign a priority to the second group based on the second attribute information and the second photographing time;
      select one or more images from the first group and the second group based upon the assigned priorities;
      request from a photographing device, image data corresponding to the selected one or more images;
      receive the image data transmitted from the photographing device; and
      continuously display the selected one or more images corresponding to the received image data within a pre-determined time range for a set display mode.

2. The electronic device of claim 1, wherein the circuitry is further configured to
   assign a higher priority to the second group of photographed images; and
   preferentially select one or more photographed images from the second group.

3. The electronic device of claim 2, wherein the circuitry is further configured to
   select a plurality of images from the first group that were periodically photographed; and
   space the selected plurality of images in a temporal evenly-spaced arrangement within the pre-determined time range.

4. The electronic device of claim 2, wherein the circuitry is further configured to
   select a pre-determined number of images from the second group when the photographed images of the second group includes a continuous sequential capturing of multiple images for a specified time based on a pre-determined user action and when the selected predetermined number of images are temporally evenly spaced within the pre-determined time range.

5. The electronic device of claim 2, wherein the circuitry is further configured to
   set an upper limit to a number of selected images from the second group of photographed images.

6. The electronic device of claim 1, wherein the circuitry is further configured to
   assign a priority to the first group for the set display mode based upon the first attribute information and the first photographing time; and
   assign a priority to the second group for the set display mode based upon the second attribute information and the second photographing time.

7. The electronic device of claim 6, wherein the set display mode includes one or more of a diary mode, an active mode, an atmospheric mode, or a timelapse mode.

8. The electronic device of claim 6, wherein the first group and the second group include one or more manually photographed still images, a manually photographed burst of consecutive images, or periodically captured still images.

9. The electronic device of claim 1, wherein the electronic device includes a camera configured to photograph images and output image data to an image processor.

10. An information processing system, comprising:
a photographing device having circuitry configured to
capture a first group of images having corresponding first attribute information and first photographing time;
record into a storage device the first attribute information and the first photographing time as attributes associated with the first group;
capture a second group of images having corresponding second attribute information and second photographing time; and
record into the storage device the second attribute information and the second photographing time as attributes associated with the second group; and
an information processing device having circuitry configured to
acquire the attributes of the first group and the second group;
assign a priority to the first group based on the first attribute information and the first photographing time;
assign a priority to the second group based on the second attribute information and the second photographing time;
select one or more images from the first group and the second group based upon the assigned priorities,
request from the photographing device, image data corresponding to the selected one or more images;
receive the image data transmitted from the photographing device; and
continuously display the selected one or more images corresponding to the received image data within a predetermined time range for a set display mode.

11. The information processing system of claim 10, wherein the first group and the second group include one or more of manually photographed still images, a manually photographed burst of consecutive images, or periodically captured still images.

12. The information processing system of claim 10, wherein the set display mode includes one or more of a diary mode, an active mode, an atmospheric mode, or a timelapse mode.

13. The information processing system of claim 10, wherein the information processing device circuitry is further configured to
temporally assign images of a higher priority within the pre-determined time range;
assign images of a lower priority within remaining time slots; and
continuously display the temporally assigned images.

14. The information processing system of claim 10, wherein the first group of images includes photography sessions of a pre-determined time interval, and the second group of images includes one or more manually-captured photography sessions.

15. The information processing system of claim 14, wherein the second group of images includes a continuous capture of multiple consecutive images for a specified time according to a pre-determined user action.

16. The information processing system of claim 14, wherein the second group of images includes one or more still images or one or more moving images captured according to user input operations.

17. The information processing system of claim 10, wherein the first photographing time of the first group and the second photographing time of the second group are predetermined.

18. A method of selecting and displaying images, the method comprising:
acquiring, via circuitry data for a first group of photographed images having corresponding first attribute information and first photographing time;
acquiring, via the circuitry data for a second group of photographed images having corresponding second attribute information and second photographing time;
assigning, via the circuitry a higher priority to the first group based on the first attribute information and the first photographing time;
assigning a lower priority to the second group based on the second attribute information and the second photographing time;
interspersing the lower priority second group within remaining time slots of the higher priority first group; and
continuously display the selected one or more images within a pre-determined time range for a set display mode, wherein the higher priority first group is temporally evenly spaced within the pre-determined time range.

* * * * *

UNITED STATES PATENT AND TRADEMARK OFFICE
CERTIFICATE OF CORRECTION

| | |
|---|---|
| PATENT NO. | : 10,003,716 B2 |
| APPLICATION NO. | : 14/666852 |
| DATED | : June 19, 2018 |
| INVENTOR(S) | : Naoto Hino et al. |

It is certified that error appears in the above-identified patent and that said Letters Patent is hereby corrected as shown below:

On the Title Page

Item (73), the 2nd Assignee's name is incorrect. Item (73) should read:
-- (73) Assignees: Sony Corporation, Tokyo (JP); Sony Mobile Communications Inc., Tokyo (JP) --

Signed and Sealed this
Eleventh Day of June, 2019

Andrei Iancu
*Director of the United States Patent and Trademark Office*